United States Patent [19]

Johnston et al.

[11] Patent Number: 5,129,495
[45] Date of Patent: Jul. 14, 1992

[54] DUAL ROLLER CLUTCH ASSEMBLY WITH ASSEMBLY INTEGRITY ASSURANCE

[75] Inventors: Albert D. Johnston, Huron; Frederick E. Lederman, Sandusky, both of Ohio;

[73] Assignee: General Motors Corporation, Detroit, Mich.

[21] Appl. No.: 793,904

[22] Filed: Nov. 18, 1991

[51] Int. Cl.⁵ .................... F16D 47/04; F16D 41/06
[52] U.S. Cl. .................... 192/48.92; 192/45; 384/560; 384/579
[58] Field of Search ............ 192/45, 48.92; 384/560, 384/576, 579

[56] References Cited

U.S. PATENT DOCUMENTS

| | | | |
|---|---|---|---|
| 4,679,676 | 7/1987 | King et al. | 192/45 |
| 4,693,351 | 9/1987 | Adolfsson | 192/48.92 |
| 4,782,931 | 11/1988 | Lederman | 192/70.12 |
| 5,056,636 | 10/1991 | Lederman | 192/45 |
| 5,062,512 | 11/1991 | Lederman | 192/45 |
| 5,074,383 | 12/1991 | Itomi | 192/45 |
| 5,078,243 | 1/1992 | Kanai et al. | 192/45 |

Primary Examiner—Richard Lorence
Attorney, Agent, or Firm—Patrick M. Griffin

[57] ABSTRACT

A dual roller clutch assembly with cages and cam races that cooperate to assure both that the cages are properly installed to the cam races and that the cam races are properly assembled relative to each other. The same structure also retains the cam races and cages together as a secure subassembly. Stops molded to the cages prevent incorrect installation of the cages to the cam races by blocking axial insertion in the incorrect direction. Locating notches in selected cam race end faces prevent incorrect relative positioning of the cam race-roller cage subassemblies by engaging a two-sided rib on the cages only when the cam races are properly oriented. The same two-sided rib retains the cam races axially together.

2 Claims, 4 Drawing Sheets

DUAL ROLLER CLUTCH ASSEMBLY WITH ASSEMBLY INTEGRITY ASSURANCE

This invention relates to overrunning roller clutches in general, and specifically to a dual roller clutch assembly with special provisions to assure proper installation and assembly.

BACKGROUND OF THE INVENTION

Overrunning roller clutches find frequent application in vehicle automatic transmissions, especially as passively acting timing mechanisms that smooth out the gear shifting process and improve shift feel. When so used, the roller clutch is located between an outer disc pack and an inner shaft or drum. Because so many disk packs, and the pistons that operate them, are crowded into ever more compact transmission housings, two overrunning clutches may often be located side by side. An example of such a transmission environment can be seen in FIG. 1 of U.S. Pat. No. 4,782,931, assigned to the assignee of the subject invention. There, the two overrunning clutches have separate outer races and separate inner races, and one of the overrunning clutches is not a roller clutch, but a sprag clutch. However, it would be possible to have two similarly located roller clutches in such an environment. In that case, there is the potential to create a simplified dual clutch assembly with a common, single pathway race. The two adjacent cam races could have cam ramps that sloped in the same direction, or in opposing directions, but, in either case, it would be desirable to provide a simple assembly that was unitized, and which had a provision to prevent the cam races and the roller clutches from being incorrectly assembled and installed.

SUMMARY OF THE INVENTION

The invention provides such a unitized dual roller clutch assembly with a multilevel assembly integrity feature, that is, with assurance both that the roller clutches are properly installed to their respective races and with assurance that the races are properly assembled relative to one another.

In its preferred embodiment, the assembly of the invention has a single, inner pathway race common to both roller clutches, and is basically conventional, apart from its extra length. The two outer, cam races are generally annular, each with a pair of flat, axially opposed end faces and a series of sloped cam races arrayed at a predetermined diameter. Since they are flat and have the same diameter, either end face of either cam race can be abutted with the other. However, in order to work properly, only two, selected end faces of the cam races may be abutted with each other. Otherwise, the cam ramps will not be properly oriented relative to each other. In the particular embodiment disclosed, the cam ramps must slope in opposite directions. In order to flag the proper cam race end faces for abutment in the final assembly, each selected cam race end face has a generally circular locating notch cut into it a diameter greater than the predetermined diameter of the cam ramps. Consequently, only when the notched end faces are abutted, with the locating notches axially adjacent, do the cam ramps face in the proper direction.

A pair of roller cages is provided, each of which is adapted to slide axially over and onto the sloped cam ramps. Because the cam races are identical in the particular embodiment disclosed, either roller cage may be installed to either cam race, so long as it is properly oriented relative to that cam race. In order to assure that each roller cage is in fact properly oriented relative to the cam race to which it is installed, each cage has a stop that is located at a diameter greater than the cam ramp diameter, and therefore will hit either end face of the cam race and stop installation of either cage in the wrong direction.

In addition, a further level of assembly integrity assurance is provided to assure proper installation of the two cam races relative to one another, as well as their unitization into a single intermediate subassembly. One of the roller cages is molded with a two-sided retention rib, each side of which is located at a diameter substantially equal to the locating notches, and shaped to snap resiliently into the adjacent locating notches when the cam races are properly abutted. Thus, the two-sided rib serves as the stop for the cage to which is ti molded, as well as blocking the other cam race and cage from being improperly assembled relative to it. In addition, the two-sided rib retains both cam races axially together as an intermediate subassembly. As a final step, the common inner pathway race is installed inside the intermediate subassembly to complete the dual roller clutch assembly.

It is, therefore, an object of the invention to provide a dual overrunning clutch assembly with a structure that cooperatively assures the integrity of the assembly process at each step.

It is another object of the invention to provide such an assembly in which stops on the roller cages assure that the cages cannot be initially incorrectly installed to the cam races, while locating notches on the cam races and a two-sided rib on one of the cages serve both as an installation stop on the one cage and also cooperate to assure proper assembly of the two cages and cam races relative to one another.

It is another object of the invention to provide such an assembly in which the same two-sided rib and locating notches that assure installation and assembly integrity also provide a unitizing action, retaining the cam races together.

It is another object of the invention to provide such an assembly in which the cam ramps slope in opposite directions in the final assembly, so that the cam races are identical, allowing either cage to be installed to either cam race.

DESCRIPTION OF THE PREFERRED EMBODIMENT

These and other objects and features of the invention will appear from the following written description, and from the drawings, in which.

Figure 1:
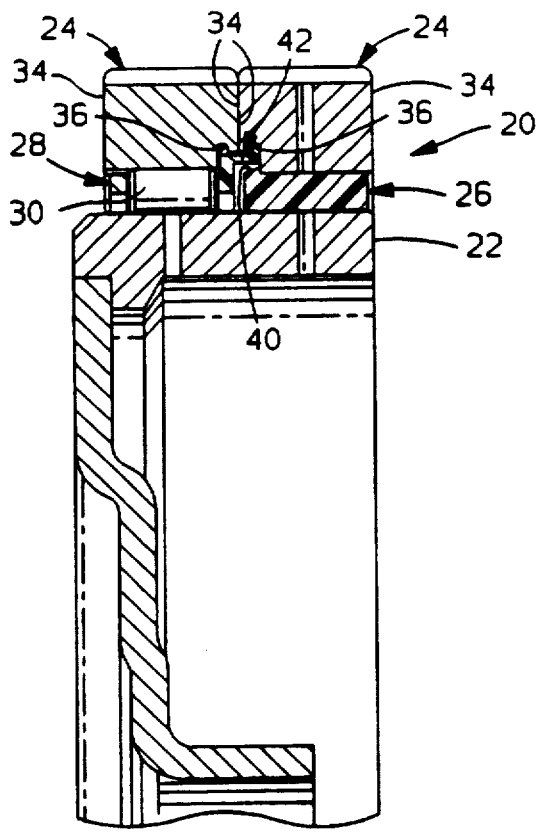
FIG. 1 is a cross section of a portion of the dual roller clutch assembly of the invention completely assembled.
Figure 2:
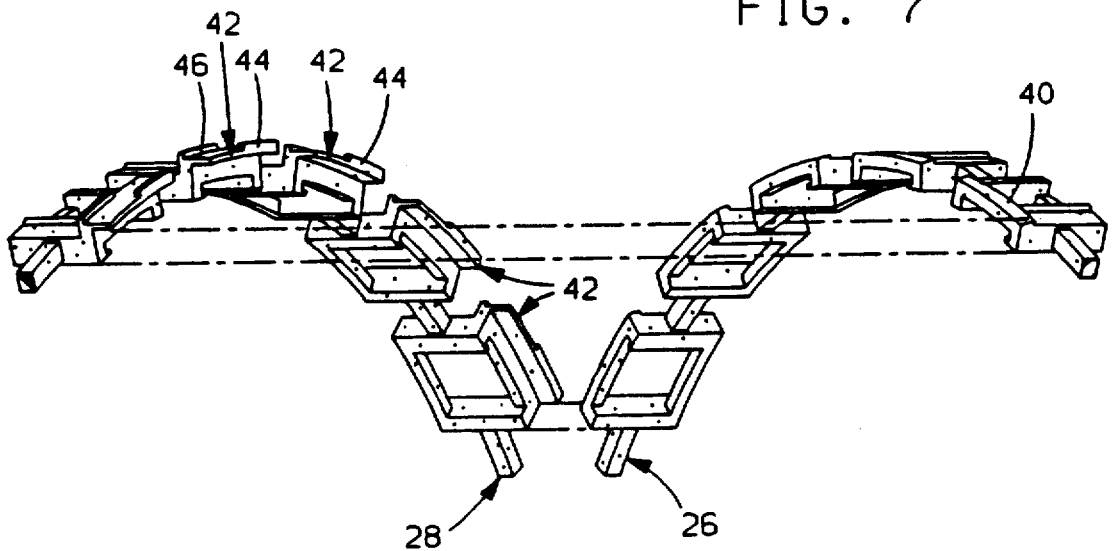
FIG. 2 is a perspective view of a portion of the two cages alone.
Figure 3:
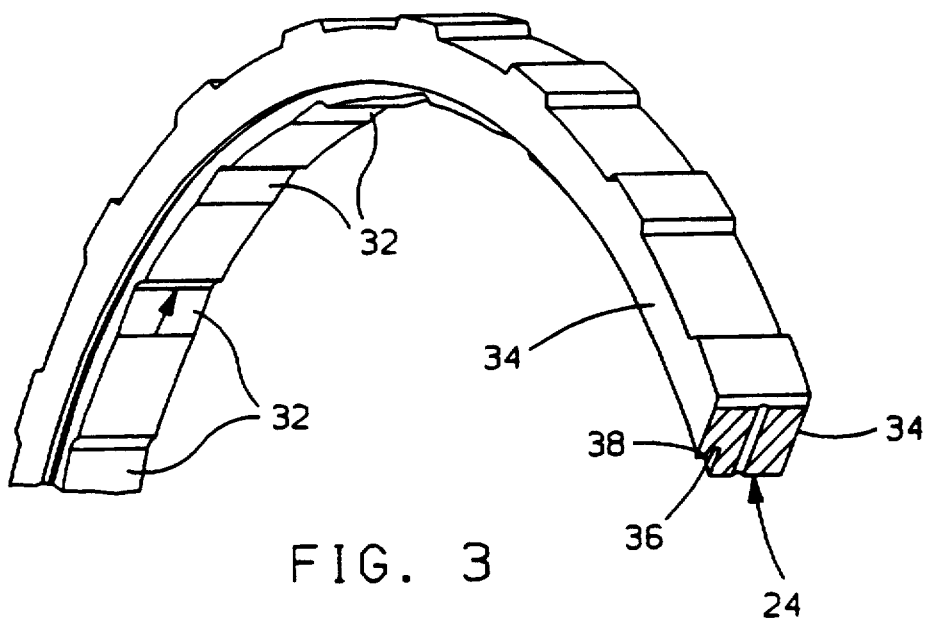
FIG. 3 is as perspective view of a portion of one cam race alone.

Referring first to FIGS. 1, 2 and 3, a preferred embodiment of the dual roller clutch assembly of the invention is indicated generally at 20. The main components are a common inner pathway race 22, a pair of identical outer cam races indicated generally at 24, a first roller cage, indicated generally at 26, and a second roller cage, indicated generally at 28. The roller cages 26 and 28 retain conventional rollers 30, as well as non-illustrated energizing springs therefor. Pathway race 22 is basically conventional, apart from being long enough to accommodate the two cages 26 and 28, rather than just one. The basic invention resides in the structure and cooperation of the the cam races 24 and the cages 26 and 28, the details of which are described next.

Figure 4:
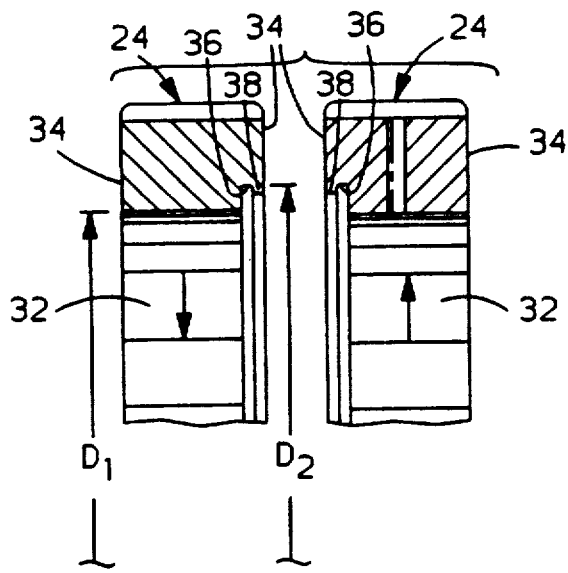
FIG. 4 is cross sectional view of the cam races alone, aligned but not abutted.

Referring next to FIGS. 3 and 4, each cam race 24 is generally annular, with a plurality of sloped cam ramps 32 and a pair of flat, axially opposed end faces 34. The cam ramps 32 slope outwardly in the directions shown by the arrows, and thus reside at no single diameter, as a cylindrical surface would. However, for ease of description, the greatest diameter of each cam ramp 32, where it terminates at the head of the arrow, will be referred to as its diameter per se, and is indicated at $D_1$ in FIG. 4. That diameter is predetermined by the size and operating characteristics desired for the roller clutch assembly 20, and other structure is sized in relation to it. For the embodiment illustrated, when the cam races 24 are properly oriented and located relative to one another, the cam ramps 32 slope in opposite directions. In order to properly orient the cam races 24, one end face 34 of each is selected to be partially cut out by a circular locating notch 36. Each locating notch has a diameter $D_2$ that is obviously greater than $D_1$, given the fact that notch 36 is radially outboard of the cam ramp 32, and is bordered by an overhanging lip 38. When, and only when, the selected end faces 34 are abutted, the cam races 24 are thereby properly located and oriented. The locating notches 36 cooperate with additional structure of the cages 26 and 28, described below, to assure complete assembly accuracy and integrity.

Figure 5:
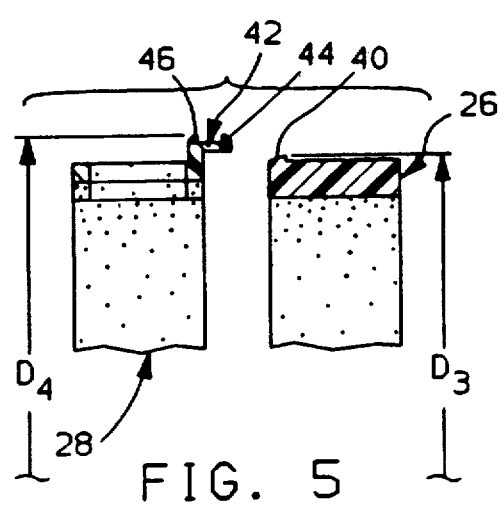
FIG. 5 is a cross sectional view of the two roller cages alone, aligned but not in their final installation position relative to one another.

Referring next to FIGS. 2 and 5, first cage 26, as is conventional, is molded with a shape that allows it to be pushed axially onto either cam race 24, provided that it is properly oriented to slide onto the the cam ramps 32. Since the cage 26 is molded of a slightly resilient plastic, it is possible that a vigorous push could get the cage 26 onto, or at least partially onto, a cam race 24 in the wrong direction. Though the mistake would be detectable as it happened, it could necessitate using a new cage 26, and would waste time at the very least. To prevent that possibility, first cage 26 is molded with a stop in the form of a circular flange 40. Flange 40 is not continuous as such, since it is molded integrally to a cage 26 that is, by its nature, divided up into pocket segments, one for each roller 30. However, every separate part of flange 40 does lie on the same circle, and so may be conveniently referred to as a single entity. The circle on which flange 40 lies which has a diameter $D_3$ that is greater than $D_1$, but less that $D_2$, and it operates as described below. The same kind of cage-to-race assembly integrity assurance is provided to second cage 28 by a two-sided retention rib 42, which, like flange 40, is not continuous as such, but also has all parts lying on common circle or circles. By two-sided, it is meant that rib 42 is molded with two sets of teeth, one set 44 on the right, and another set 46 on the left, as seen in FIG. 5. Both sets of teeth 44 and 46 reside at a diameter $D_4$ that is substantially equal to $D_2$, and are axially spaced apart by the same distance that the two locating notches 36 are axially spaced apart when the cam race end faces 34 into which they are cut are abutted. Also, as best seen in FIG. 2, the two sets of teeth 44 and 46 are designed to have no overlap, so that second cage 28 may be easily molded.

Figure 6:
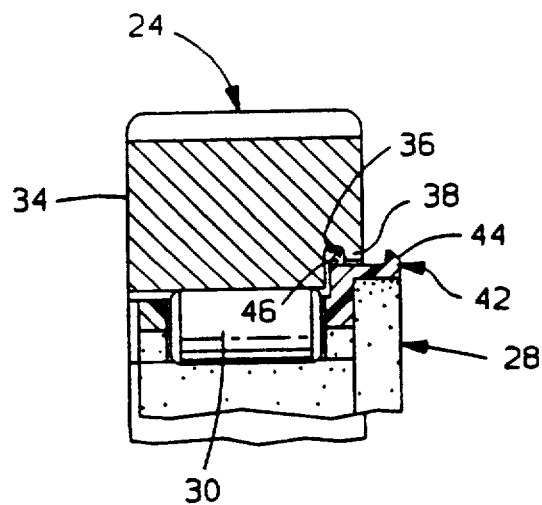
FIG. 6 is a view of the left hand cage of FIG. 5 installed to a cam race.
Figure 7:
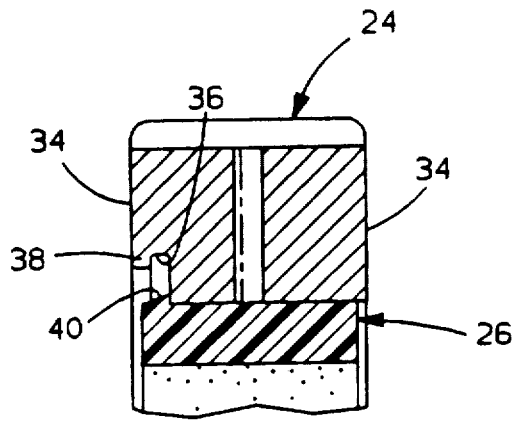
FIG. 7 is a view of the right hand cage of FIG. 5 installed to a cam race.

Referring next to FIGS. 6 and 7, the initial steps in the process by which assembly 10 is built up are illustrated. As noted above, each of the cages 26 and 28 is installed to a cam race 24 with an axial push fit. Since the cam races 24 are identical, each cam accept either cage 26 or 28, provided it is properly oriented. The fact that the flange 40 and rib 42 are located at a diameter outboard of the cam ramps 32 means that each cage 26 and 28 can be installed only in the proper orientation to either cam race 24. Otherwise, the flange 40 or rib 42 would hit an end face 34, and thereby stop the cage 26 or 28 from being installed incorrectly. In the case of second cage 28, the snap fit of the left hand teeth 46 under the lip 38 and into notch 36 means that there is complete axial retention of cage 28 to its cam race 24, creating a true intermediate subassembly of the two. In the case of first cage 26, there is not complete axial retention, since cage 26 could still slide off of its cam race 24 to the left, as seen in FIG. 7. However, flange 40 is inset axially from the remainder of the notched end face 34, even though it does not snap into the notch 36, which serves a useful purpose described next.

Figure 8:
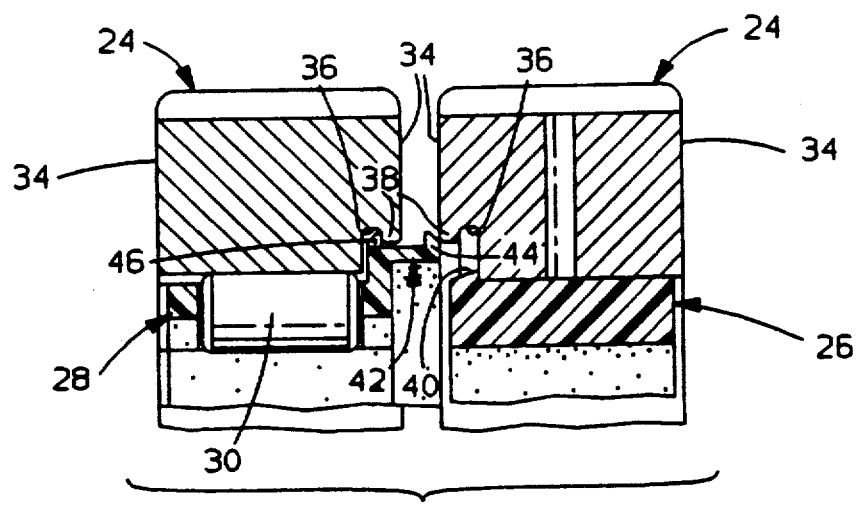
FIG. 8 is a view of the two intermediate subassemblies of cage and cam race aligned, but not yet assembled together.
Figure 9:
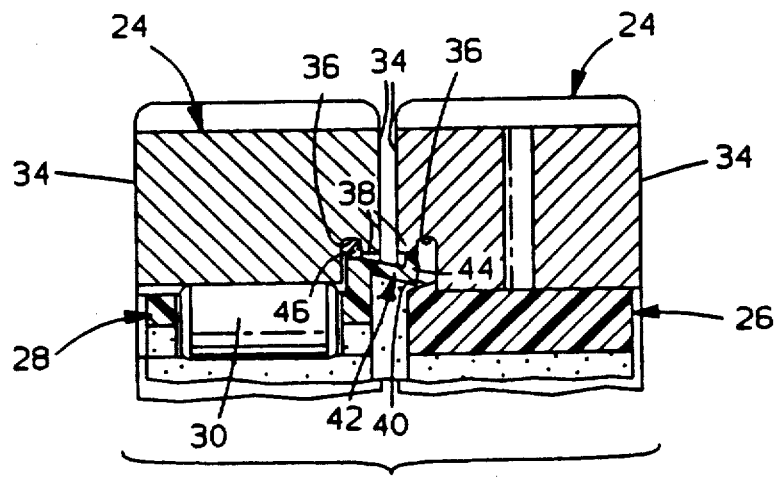
FIG. 9 is a view of the two subassemblies of FIG. 8 in the process of being assembled together.
Figure 10:
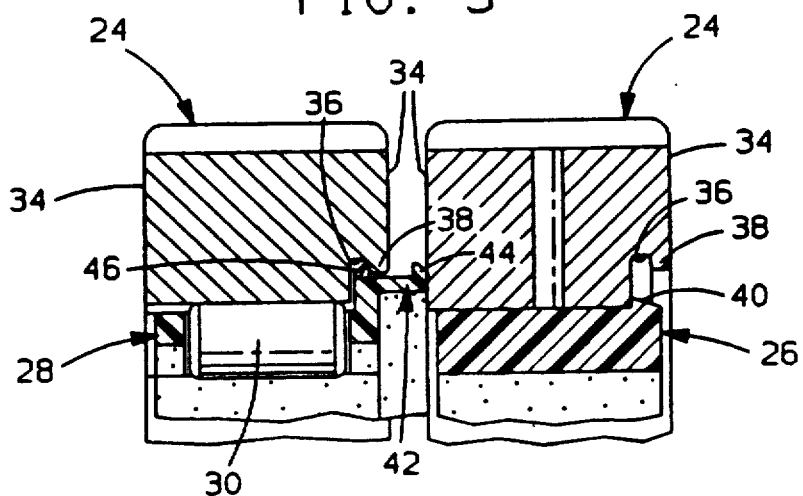
FIG. 10 is a view showing the result of attempting to assemble the two subassemblies of FIG. 9 backward.
Figure 11:
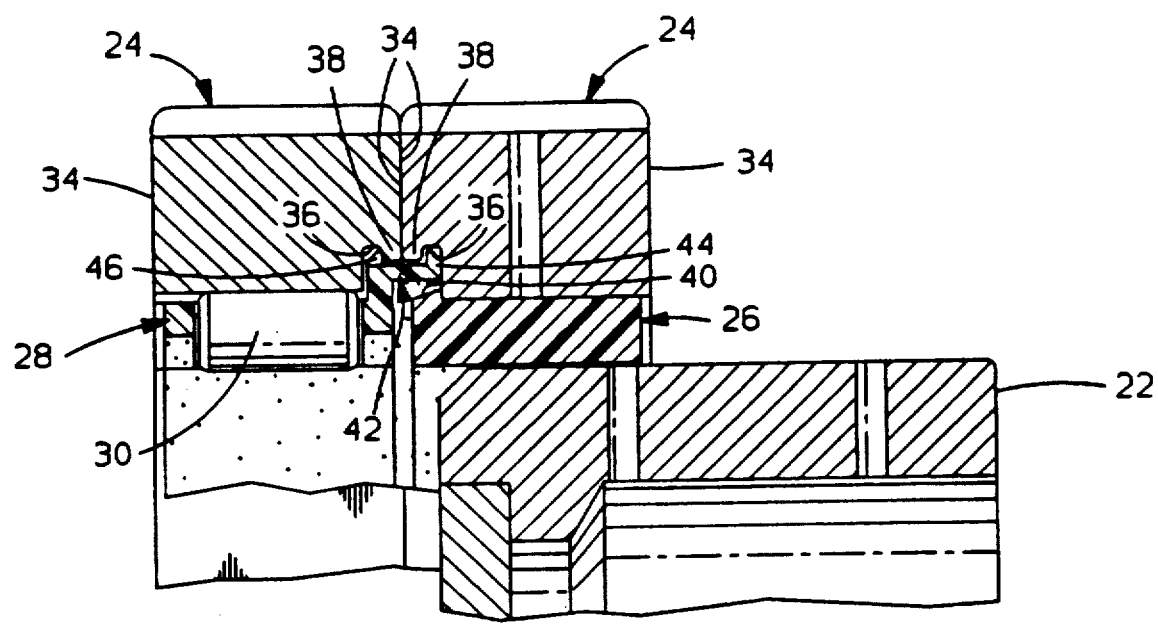
FIG. 11 shows the common pathway race initially being assembled inside the right hand cam race-cage subassembly.

Referring next to FIGS. 8 through 11, the intermediate steps in the build-up of assembly 10 are illustrated. As seen in FIGS. 8 and 9, the remaining set of teeth 44 that extend out beyond the selected end face 34 may be fitted into the locating notch 36 of the other cam race 24, resiliently snapping past the lip 38 as the two cam races 24 are pushed axially together. Should an attempt be made to abut the cam races 24 in the wrong direction, as illustrated in FIG. 10, the retention rib 42 will act as a stop member to signal the mistake. When the selected cam race end faces 34 are abutted, as shown in FIG. 11, the two cam races 24 are retained axially together by the two sets of teeth 44 and 46. In addition, the flange 40 is sheltered beneath the rib 42, given its lesser diameter, and is blocked from sliding to the left by the adjacent cage 28. Consequently, the two cam races 24 and the cages 26 and 28 are all mutually retained together as another intermediate subassembly. Therefore, the same structures, the rib 42, flange 40 and notches 36 cooperate to assure assembly integrity at multiple levels, that is, both at the intermediate and the final steps of the build process, and also give mutual component retention.

Figure 12:
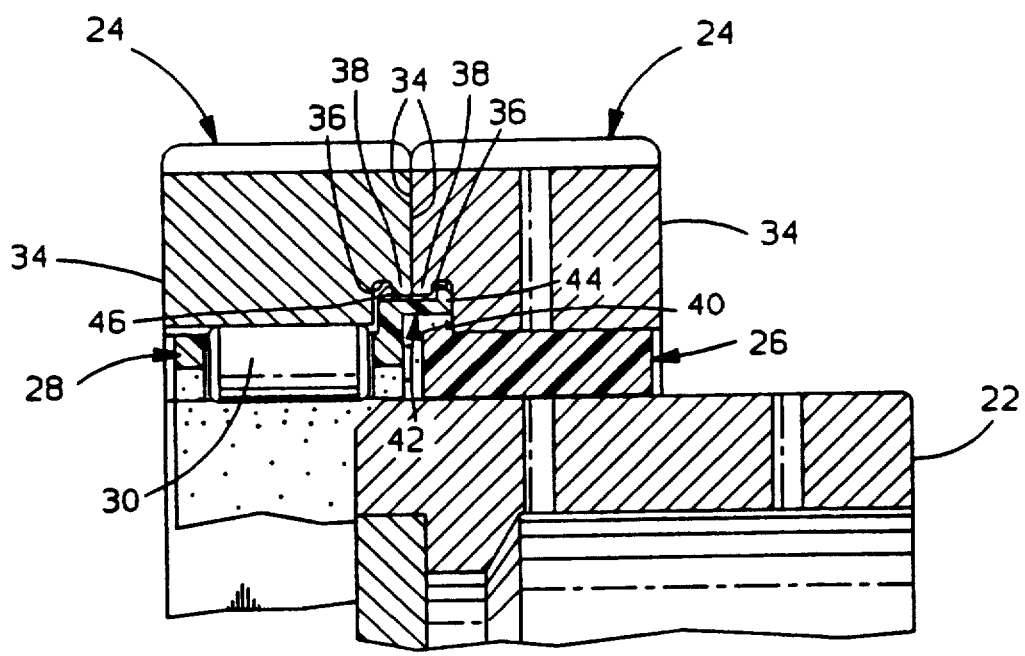
FIG. 12 shows the common pathway race beginning to be assembled inside the left hand cam race-cage subassembly.

Referring finally to FIGS. 11 and 12, the steps that complete assembly 10 are illustrated. Installation of the inner pathway race 22 is accomplished by a variation of the conventional "ringing in" installation technique.

Generally, as those skilled in the art will recognize, the cam race and cage subassembly are held stationary while the pathway race is pushed axially on and simultaneously twisted down ramp position. This shifts the rollers down the cam ramps, and allows the pathway race to move axially over them. Here, as shown in FIG. 11, it is easier to hold the pathway race 22 stationary, and to twist the right hand cam race 24 in the down ramp position, that is, into the page. This allows pathway race 22 to move axially inside first cage 26 and its rollers 30. Then, when pathway race 22 reaches the left hand cam race 24, it is twisted in the opposite direction, out of the page. The twisting action of the right hand cam race 24 into the page is continued, so that the left hand cam race 24 will not carry it along and into its lock up position. When pathway race 22 has been fully axially inserted inside second cage 28 and its rollers 30, assembly 10 is complete. As the pathway race 22 is rung in, the components described above no longer act to assure assembly integrity as such, but the retention of the cam races 24 together by the two-sided rib 42 does ease the process. When installed in a transmission, a further advantage of the assembly 20 is the fact that the rib 42 and flange 40 are both entirely encased and protected between the two notched and abutted end faces 34, and no cage structure is exposed beyond the other two end faces 24.

Variations of the embodiment disclosed could be made. If it were desired in a different application that the cam races 24 have cam ramps 32 that faced in the same direction, then two cam race end faces could still be selected for notching to assure that the cam races could not be incorrectly assembled relative to one other. However, the cam races would not then be identical, so it would not be possible to assemble each cage to either cam race. Rather, each cage would have to be selected somehow to match its particular cam race. Once that was done, a stop like flange 40, would prevent its incorrect installation to the properly selected cam race, but would not necessarily prevent its attempted installation to the improperly selected cam race. In such a case, when the cam races are not identical anyway, a suitable alternative would be to have locating notches of differing diameter and shape, uniquely tailored to a stop on the respective cages, so as to prevent installation of the cage to the improperly selected cam race, as well as to prevent incorrect installation to the properly selected cam race. Therefore, it will be understood that it is not intended to limit the invention to just the embodiment disclosed.

The embodiments of the invention in which an exclusive property or privilege is claimed are defined as follows:

1. A dual overrunning roller clutch assembly having multilevel assembly integrity assurance, comprising,
   a common, single pathway race,
   a pair of generally annular cam races, each having a plurality of cam ramps situated at a predetermined diameter and a pair of axially opposed end faces, a selected end face of each cam race also having a generally circular locating notch cut therein at a diameter radially outboard of said predetermined diameter such that, when said selected end faces are abutted, said locating notches are axially adjacent and said cam ramps face in the proper operational direction,
   a first roller cage adapted to be installed to one cam race and having a locating stop abuttable with an end face of said one cam race and located at a diameter outboard of said predetermined diameter, thereby assuring that said first roller cage is properly installed to said one cam race, and,
   a second roller cage adapted to be installed to the other cam race and having a two-sided retention rib, each side of which is located at a diameter substantially equal to said locating notches so as to be engageable with said locating notches, thereby assuring both that said second roller cage is properly installed to said other cam race and also assuring that said cam races are retained axially together and installed to said assembly only when said selected end faces are abutted,
   whereby, each cage is assured of proper installation to its respective cam race and said cam races are further assured of proper assembly relative to each other.

2. A dual overrunning roller clutch assembly having multilevel assembly integrity assurance, comprising,
   a common, single pathway race,
   a pair of generally annular, substantially identical cam races, each having a plurality of cam ramps situated at a predetermined diameter and a pair of axially opposed end faces, one end face of each cam race also having a generally circular locating notch cut therein at a diameter radially outboard of said predetermined diameter such that, when said notched selected end faces are abutted, said locating notches are axially adjacent and said cam ramps face in opposite directions,
   a first roller cage adapted to be installed to either cam race and having a locating stop abuttable with an end face of either cam race and located at a diameter outboard of said predetermined diameter, thereby assuring that said first roller cage is properly installed to a cam race, and,
   a second roller cage adapted to be installed to either cam race and having a two-sided retention rib, each side of which is located at a diameter substantially equal to said locating notches thereby assuring both that said second roller cage is properly installed to a cam race and also assuring that said cam races are retained axially together and installed to said assembly only when said selected end faces are abutted,
   whereby, each cage is assured of proper installation to either cam race and said cam races are further assured of proper assembly relative to each other.

* * * * *